USO12537333B2

(12) United States Patent
Yamada

(10) Patent No.: US 12,537,333 B2
(45) Date of Patent: Jan. 27, 2026

(54) ELECTRIC SHOCK PREVENTION CAP AND CONNECTOR WITH ELECTRIC SHOCK PREVENTION CAP

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Yusuke Yamada, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 830 days.

(21) Appl. No.: 17/792,267

(22) PCT Filed: Jan. 12, 2021

(86) PCT No.: PCT/JP2021/000631
§ 371 (c)(1),
(2) Date: Jul. 12, 2022

(87) PCT Pub. No.: WO2021/149531
PCT Pub. Date: Jul. 29, 2021

(65) Prior Publication Data
US 2023/0040389 A1 Feb. 9, 2023

(30) Foreign Application Priority Data

Jan. 21, 2020 (JP) .................................. 2020-007747

(51) Int. Cl.
*H02J 7/00* (2006.01)
*B60L 53/16* (2019.01)
*H01R 13/447* (2006.01)

(52) U.S. Cl.
CPC ............ *H01R 13/447* (2013.01); *B60L 53/16* (2019.02)

(58) Field of Classification Search
None
See application file for complete search history.

(56) References Cited

U.S. PATENT DOCUMENTS 7,955,110 B1    6/2011  Kataoka et al.
2017/0222351 A1*  8/2017  Kamei .................. H01R 13/44
(Continued)

FOREIGN PATENT DOCUMENTS

JP    S53-032400 A    3/1978

OTHER PUBLICATIONS

International Search Report issued on Apr. 6, 2021 for WO 2021/149531 A1 (4 pages).

*Primary Examiner* — Arun C Williams
(74) *Attorney, Agent, or Firm* — Venjuris, P.C.

(57) ABSTRACT

An electric shock prevention cap of a novel structure and a connector with electric shock prevention cap are disclosed. The electric shock prevention cap can be easily mounted on a pair of terminal body portions, obtain a large holding force and prevent the pair of terminal body portions from contacting facing surfaces. An electric shock prevention cap 10 is provided with a pair of peripheral edge covering portions 12, 12 for covering peripheral edges of tip parts of a pair of terminal body portions 42, 42 by being mounted on the pair of terminal body portions 42, 42 in the form of flat plates and disposed side by side in a plate thickness direction, and an inner intrusion preventing portion 20 provided between the
(Continued)

pair of peripheral edge covering portions 12, 12 to couple the pair of peripheral edge covering portions 12, 12 to each other.

12 Claims, 13 Drawing Sheets

(56) References Cited

U.S. PATENT DOCUMENTS

| | | |
|---|---|---|
| 2020/0259288 A1 | 8/2020 | Yamanashi |
| 2021/0135387 A1 | 5/2021 | Kobayashi et al. |
| 2021/0257768 A1 | 8/2021 | Shimizu et al. |

* cited by examiner

ELECTRIC SHOCK PREVENTION CAP AND CONNECTOR WITH ELECTRIC SHOCK PREVENTION CAP

CROSS REFERENCE TO RELATED APPLICATIONS

This application is a national phase of PCT application No. PCT/JP2021/000631, filed on 12 Jan. 2021, which claims priority from Japanese patent application No. 2020-007747, filed on 21 Jan. 2020, all of which are incorporated herein by reference.

TECHNICAL FIELD

The present disclosure relates to an electric shock prevention cap for preventing an electric shock due to contact with a terminal fitting and a connector with electric shock prevention cap in which an electric shock prevention cap is mounted on a terminal.

BACKGROUND

Conventionally, an electric shock prevention structure needs to be provided to prevent an electric shock due to contact with a terminal fitting by a finger of a worker handling a connector, a tool or the like in a high-voltage connector used, for example, in hybrid vehicles, electric vehicles and the like. For example, a protection cap for covering a peripheral edge of a tip part of a terminal body portion in the form of a flat plate is shown in Patent Document 1.

PRIOR ART DOCUMENT

Patent Document

Patent Document 1: JP 2019-185932 A

SUMMARY OF THE INVENTION

Problems to be Solved

However, if the protection cap is mounted on the terminal body portion in the form of a flat plate to cover the peripheral edge apart from both surfaces in a plate thickness direction of the terminal body portion, a contact area of the protection cap with the terminal body portion is small and a holding force for holding the protection cap in a state mounted on the terminal body portion is small. As a result, it has been difficult to mount the protection cap on the terminal body portion and the protection cap mounted on the terminal body portion has easily come off from the terminal body portion. Further, if a connector includes a pair of terminal fittings as shown in Patent Document 1, the protection cap is mounted on the terminal body portion of each terminal fitting, but the number of the protection caps increases and an operation of mounting the protection caps on the terminal body portions becomes cumbersome. Further, facing surfaces of a pair of the terminal body portions are not covered by the protection caps, and it has been necessary to prevent the intrusion of a finger or tool into a space between the pair of terminal body portions, such as by providing a rib projecting into a space between the pair of terminal body portions from a housing of the connector separately from the electric shock prevention caps.

Accordingly, an electric shock prevention cap of a novel structure and a connector with electric shock prevention cap using the electric shock preventing cap are disclosed. The electric shock prevention cap can be easily mounted on a pair of terminal body portions, obtain a relatively large holding force and prevent contact with facing surfaces of the pair of terminal body portions.

Means to Solve the Problem

The present disclosure is directed to an electric shock prevention cap with a pair of peripheral edge covering portions for covering peripheral edges of tip parts of a pair of terminal body portions by being mounted on the pair of terminal body portions in the form of flat plates and disposed side by side in a plate thickness direction, and an inner intrusion preventing portion provided between the pair of peripheral edge covering portions to couple the pair of peripheral edge covering portions to each other.

Effect of the Invention

According to the present disclosure, an electric shock prevention cap can be easily mounted on a pair of terminal body portions, obtain a relatively large holding force and prevent contact with facing surfaces of the pair of terminal body portions.

DETAILED DESCRIPTION TO EXECUTE THE INVENTION

Description of Embodiments of Present Disclosure

Figure 1:
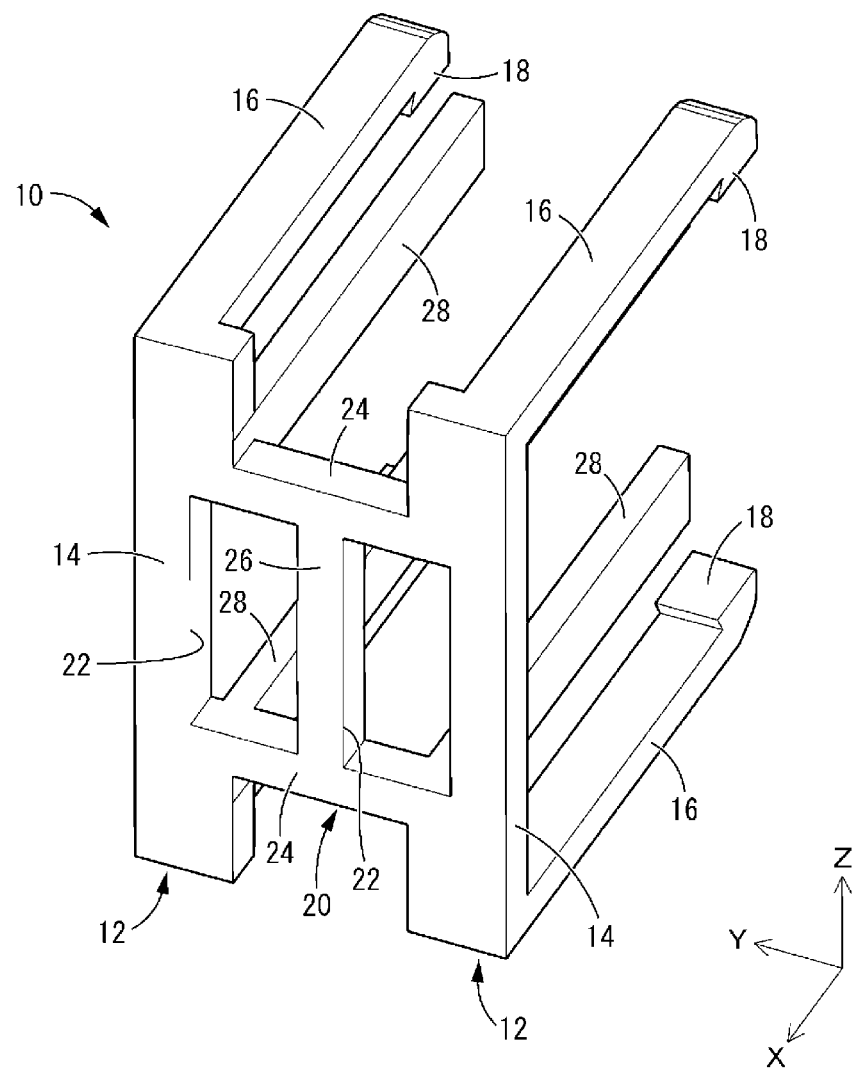
FIG. 1 is a perspective view of an electric shock prevention cap according to a first embodiment.
Figure 2:
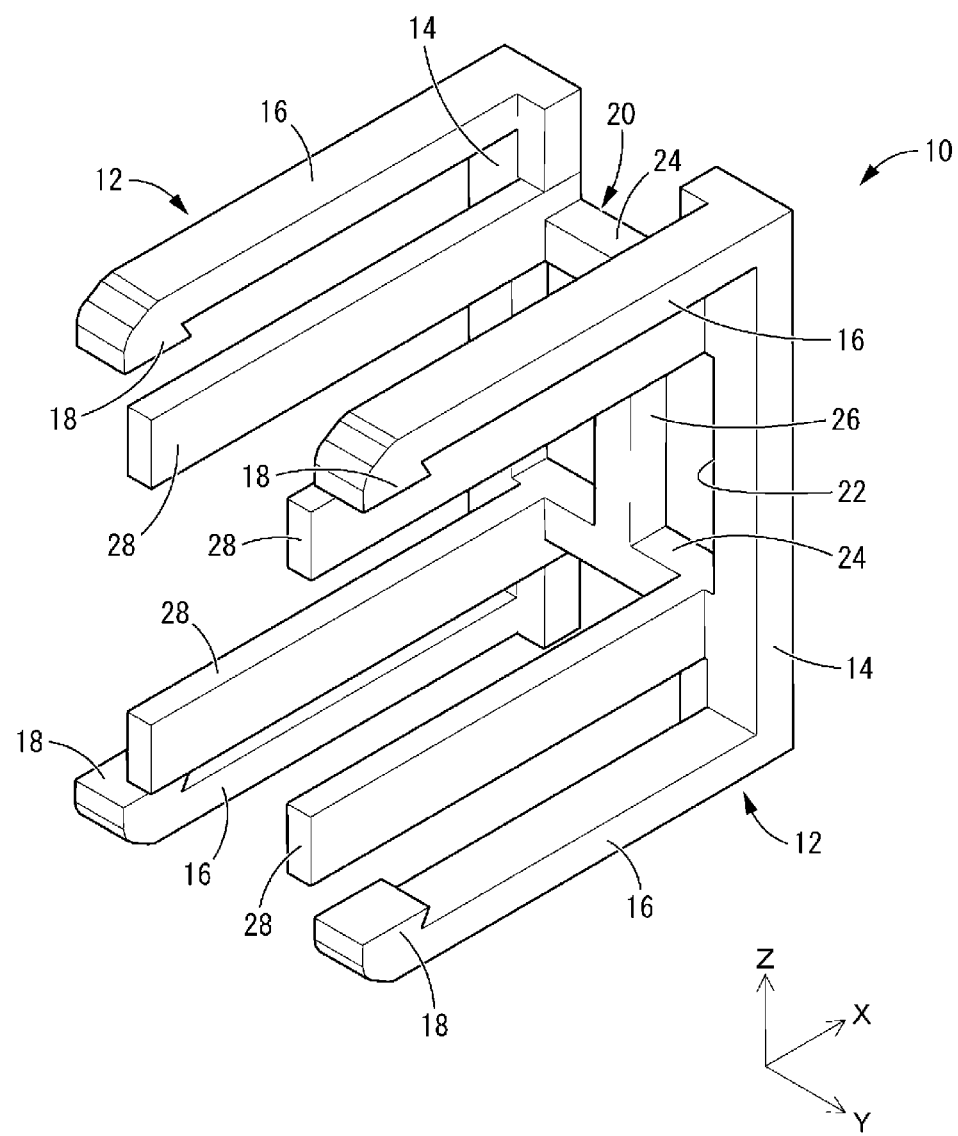
FIG. 2 is a perspective view showing the electric shock prevention cap shown in FIG. 1 when viewed from another direction.
Figure 3:
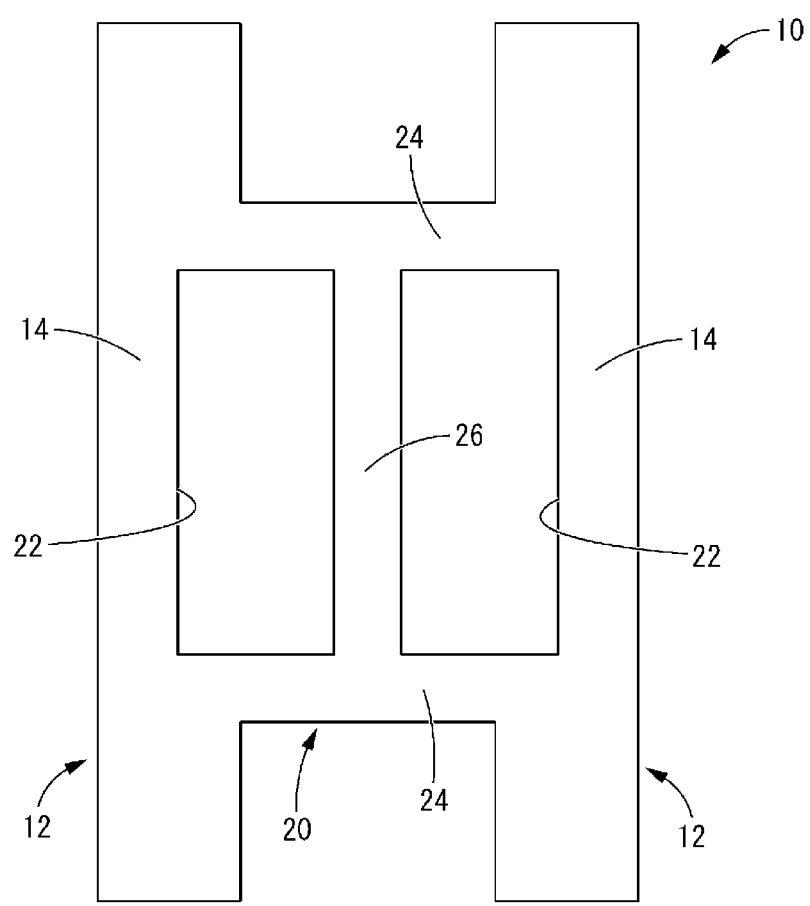
FIG. 3 is a front view of the electric shock prevention cap shown in FIG. 1.
Figure 4:
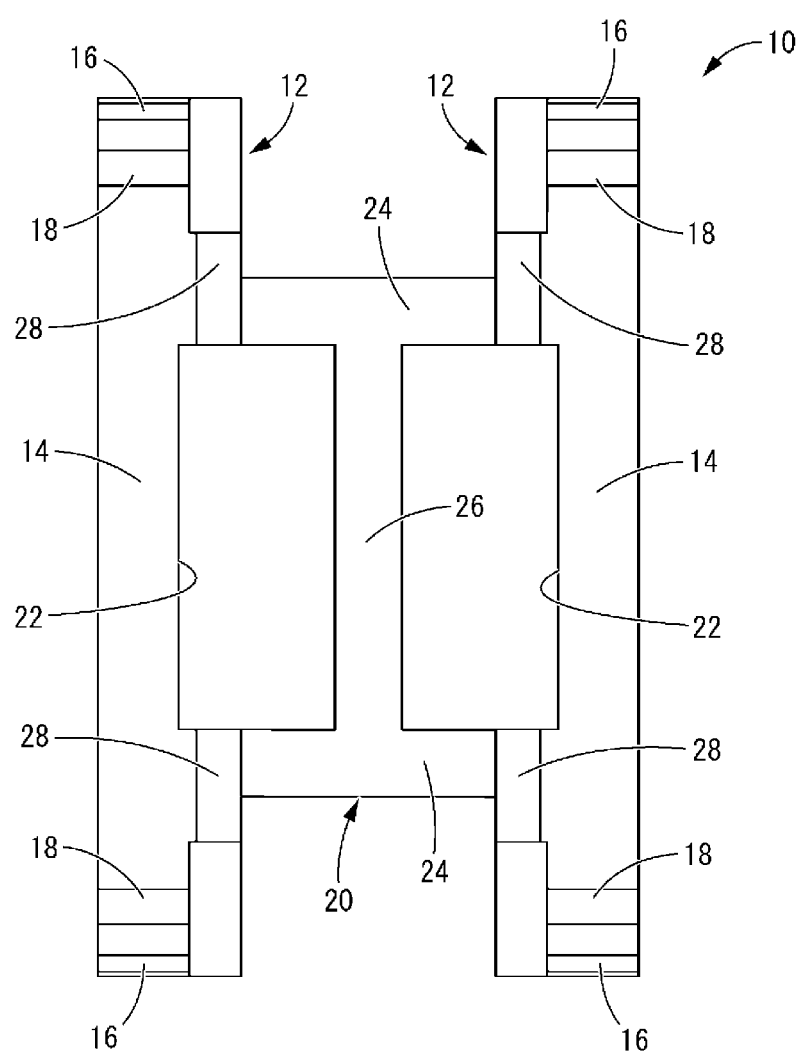
FIG. 4 is a back view of the electric shock prevention cap shown in FIG. 1.

First, embodiments of the present disclosure are listed and described.

(1) The electric shock prevention cap of the present disclosure is provided with a pair of peripheral edge covering portions for covering peripheral edges of tip parts of a pair of terminal body portions by being mounted on the pair of terminal body portions in the form of flat plates and disposed side by side in a plate thickness direction, and an inner intrusion preventing portion provided between the pair of peripheral edge covering portions to couple the pair of peripheral edge covering portions to each other.

According to the electric shock prevention cap of the present disclosure, since the pair of peripheral edge covering portions are coupled to each other by the inner intrusion preventing portion, the electric shock prevention cap can be collectively and simultaneously mounted on the pair of terminal body portions disposed side by side. Further, since the electric shock prevention cap is collectively mounted on the pair of terminal body portions and has a large overlapping area with the terminal body portions, a large holding force for holding the electric shock prevention cap on the terminal body portions is obtained and the electric shock prevention cap is unlikely to come off from the terminal body portions.

An electric shock due to the contact of a finger or tool with the peripheral edge including the tip surface of the terminal body portion is prevented by covering the peripheral edge of the tip part of the terminal body portion by the peripheral edge covering portion. Further, the intrusion of a finger or tool into between the pair of terminal body portions facing each other is prevented by the inner intrusion preventing portion, whereby an electric shock due to contact with the facing inner surfaces of the pair of terminal body portions can also be prevented by the electric shock prevention cap.

(2) Preferably, a detachment prevention rib is provided which is to be overlapped on a surface in the plate thickness direction of the terminal body portion. This is because the electric shock prevention cap is prevented from coming off in the plate thickness direction from the terminal body portion by the locking of the detachment prevention rib and the terminal body portion.

(3) Preferably, the peripheral edge covering portion is provided with a locking projection projecting toward the terminal body portion and to be locked to a peripheral edge part of the terminal body portion. This is because a movement of the electric shock prevention cap toward the tip side of the terminal body portion is limited and the electric shock prevention cap is prevented from coming off toward a terminal tip side by locking the locking projection to the peripheral edger part of the terminal body portion.

(4) Preferably, the inner intrusion preventing portion is provided with an insertion hole penetrating therethrough. According to this, the mating terminal can be inserted through the insertion hole and overlapped on the terminal body portion, for example, if the mating terminal is overlapped on an inner surface in the plate thickness direction of the terminal body portion. Further, a finger contact prevention rib can be inserted through the insertion hole and is unlikely to obstruct the connection of the terminal body portion and the mating terminal, for example, if the finger contact prevention rib projects between the mating terminals.

(5) Preferably, a pair of outer intrusion preventing portions are provided on sides opposite to the inner intrusion preventing portion with respect to the pair of peripheral edge covering portions. This is because, if a space into which a finger or tool is insertable is, for example, present outside the terminal body portion in the plate thickness direction, the insertion of the finger or tool into this pace is prevented by the outer intrusion preventing portion and an electric shock due to contact with the outer surface of the terminal body portion is also prevented by the electric shock prevention cap.

(6) The connector with electric shock prevention cap of the present disclosure is provided with a pair of terminal fittings including terminal body portions in the form of flat plates and disposed side by side in a plate thickness direction of the terminal body portions, and an electric shock prevention cap to be mounted on a pair of the terminal body portions, wherein the electric shock prevention cap includes a pair of peripheral edge covering portions for covering peripheral edges of tip parts of the pair of terminal body portions, and an inner intrusion preventing portion provided between the pair of peripheral edge covering portions to couple the pair of peripheral edge covering portions to each other.

According to the connector with electric shock prevention cap of the present disclosure, since the pair of peripheral edge covering portions of the electric shock prevention cap are coupled to each other by the inner intrusion preventing portion, the electric shock prevention cap can be collectively and simultaneously mounted on the pair of terminal body portions disposed side by side. Therefore, the number of steps in an operation required to mount the electric shock prevention cap is reduced. Further, since the electric shock prevention cap is collectively mounted on the pair of terminal body portions and has a large overlapping area with the terminal body portions, a large holding force for holding the electric shock prevention cap on the terminal body portions is obtained and the electric shock prevention cap is unlikely to come off from the terminal body portions.

An electric shock due to the contact of a finger or tool with the peripheral edge including the tip surface of the terminal body portion is prevented by covering the peripheral edge of the tip part of the terminal body portion by the peripheral edge covering portion of the electric shock prevention cap. Further, the intrusion of a finger or tool into between the pair of terminal body portions facing each other is prevented by the inner intrusion preventing portion of the electric shock prevention cap, whereby an electric shock due to contact with the facing inner surfaces of the pair of terminal body portions can also be prevented by the electric shock prevention cap.

Details of Embodiments of Present Disclosure

Specific examples of an electric shock prevention cap of the present disclosure are described below with reference to the drawings. Note that the present disclosure is not limited to these illustrations and is intended to be represented by claims and include all changes in the scope of claims and in the meaning and scope of equivalents.

First Embodiment

Hereinafter, a first embodiment of the present disclosure is described with reference to FIGS. 1 to 8. An electric shock prevention cap 10 of the first embodiment prevents an electric shock due to the contact of a finger or tool with a pair of terminal body portions 42, 42 constituting a connector with electric shock prevention cap 30 to be described later, for example, by being mounted on the terminal body portions 42, 42. In the following description, an upward direction is a Z direction in FIG. 1, a forward direction is an X direction in FIG. 1, and a rightward direction is a Y direction in FIG. 1. Further, for a plurality of identical members, only some members may be denoted by a reference sign and the other members may not be denoted by the reference sign.

<Electric Shock Prevention Cap 10>

The electric shock prevention cap 10 is made of an electrically insulating material such as a synthetic resin. The electric shock prevention cap 10 includes a pair of peripheral edge covering portions 12, 12 for covering peripheral edges of tip parts of the terminal body portions 42, 42 to be described later as shown in FIGS. 1 to 4.

<Peripheral Edge Covering Portions 12>

The peripheral edge covering portion 12 is U-shaped as a whole and integrally includes a tip covering portion 14 to be overlapped on the tip surface of the terminal body portion 42 and a pair of side edge covering portions 16, 16 extending rearward from both ends in a vertical direction of the tip covering portion 14.

<Tip Covering Portion 14>

The tip covering portion 14 is dimensioned and shaped to be able to cover the entire tip surface of the terminal body portion 42 to be described later. The tip covering portion 14 of this embodiment linearly extends in the vertical direction while having a rectangular cross-section. A specific shape of the tip covering portion 14 is not particularly limited and the tip covering portion 14 can have a curved shape, for example, if the tip surface of the terminal body portion 42 is curved.

<Side Edge Covering Portions 16>

The side edge covering portion 16 is dimensioned and shaped to be able to entirely cover a side surface in a vertical direction of the terminal body portion 42 to be described later. The side edge covering portion 16 of this embodiment linearly extends in a front-rear direction while having a rectangular cross-section. A specific shape of the side edge covering portion 16 is set according to the shape of the terminal body portion 42 to be described later, and can have a curved shape, for example, if the side surface of the terminal body portion 42 is curved.

<Locking Projections 18>

Further, a locking projection 18 projecting vertically inward is provided on a rear end part of the side edge covering portion 16. The front side surface of the locking projection 18 is formed into an inclined surface inclined forward toward a vertically inner side. In this embodiment, the locking projection 18 is provided on each of four side edge covering portions 16. Note that the vertically inner side in the side edge covering portion 16 means a lower side in the side edge covering portion 16 provided on an upper end part of the tip covering portion 14, and means an upper side in the side edge covering portion 16 provided on a lower end part of the tip covering portion 14.

<Inner Intrusion Preventing Portion 20>

An inner intrusion preventing portion 20 is provided between the pair of peripheral edge covering portions 12, 12. The inner intrusion preventing portion 20 is in the form of a plate extending in a lateral direction as a whole. Both ends in the lateral direction of the inner intrusion preventing portion 20 are integrally connected to the tip covering portions 14, 14. In this way, the peripheral edge covering portions 12, 12 are integrally coupled by the inner intrusion preventing portion 20 at the tip covering portions 14, 14.

<Insertion Holes 22>

The inner intrusion preventing portion 20 is provided with insertion holes 22. The insertion holes 22 are provided to penetrate in the front-rear direction while having a rectangular cross-section. Two insertion holes 22 are provided side by side while being separated by a predetermined distance in the lateral direction. The inner intrusion preventing portion 20 includes coupling portions 24 extending in the lateral direction on outer sides of the insertion holes 22 in the vertical direction and a dividing portion 26 extending in the vertical direction between the two insertion holes 22 and 22. In short, the inner intrusion preventing portion 20 includes the upper and lower coupling portions 24, 24 coupling the tip covering portions 14, 14 to each other and the dividing portion 26 coupling those coupling portions 24, 24 to each other. By providing the dividing portion 26, a space formed between the upper and lower coupling portions 24 is divided into the two insertion holes 22, 22, and each insertion hole 22 is so sized that the insertion of a finger, a tool or the like is impossible.

<Detachment Preventing Ribs 28>

The tip covering portion 14 is provided with a pair of detachment prevention ribs 28, 28. The detachment prevention rib 28 is in the form of a bar or plate extending from the tip covering portion 14 toward a base end side. The detachment prevention ribs 28 of this embodiment extend rearward from two positions separated in the vertical direction on the tip covering portion 14. The detachment prevention ribs 28 are located inwardly of the side edge covering portions 16 in the vertical direction and inwardly of the side edge covering portions 16 in the lateral direction.

<Connector with Electric Shock Prevention Cap 30>

Figure 5:
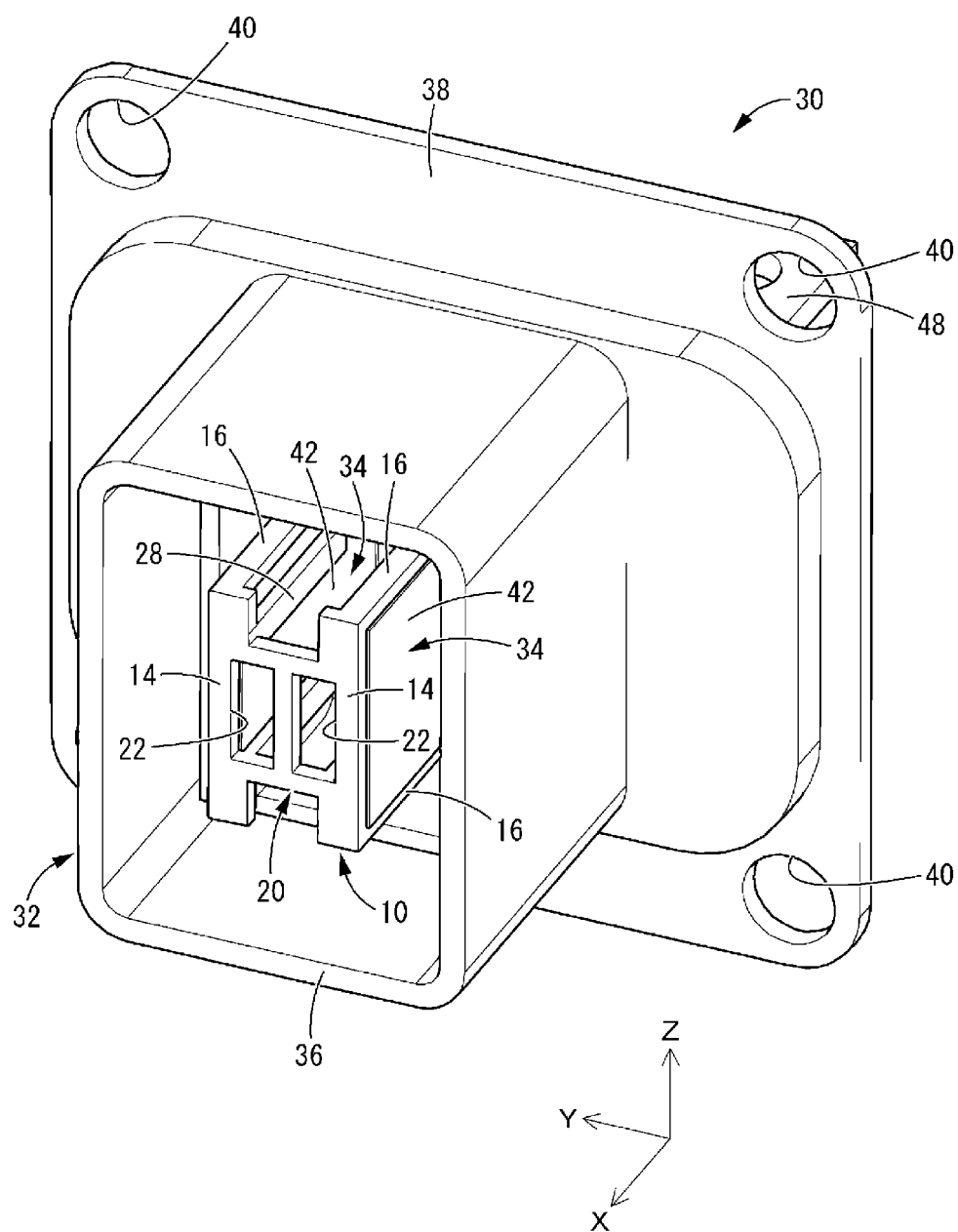
FIG. 5 is a perspective view of a connector with electric shock prevention cap equipped with the electric shock prevention cap shown in FIG. 1.

The electric shock prevention cap 10 structured as just described is mounted on the terminal body portions 42, 42 to be described later in the connector with electric shock prevention cap 30 as shown in FIG. 5. The connector with electric shock prevention cap 30 is structured such that a pair of terminal fittings 34, 34 are mounted in a connector housing 32.

<Connector Housing 32>

Figure 6:
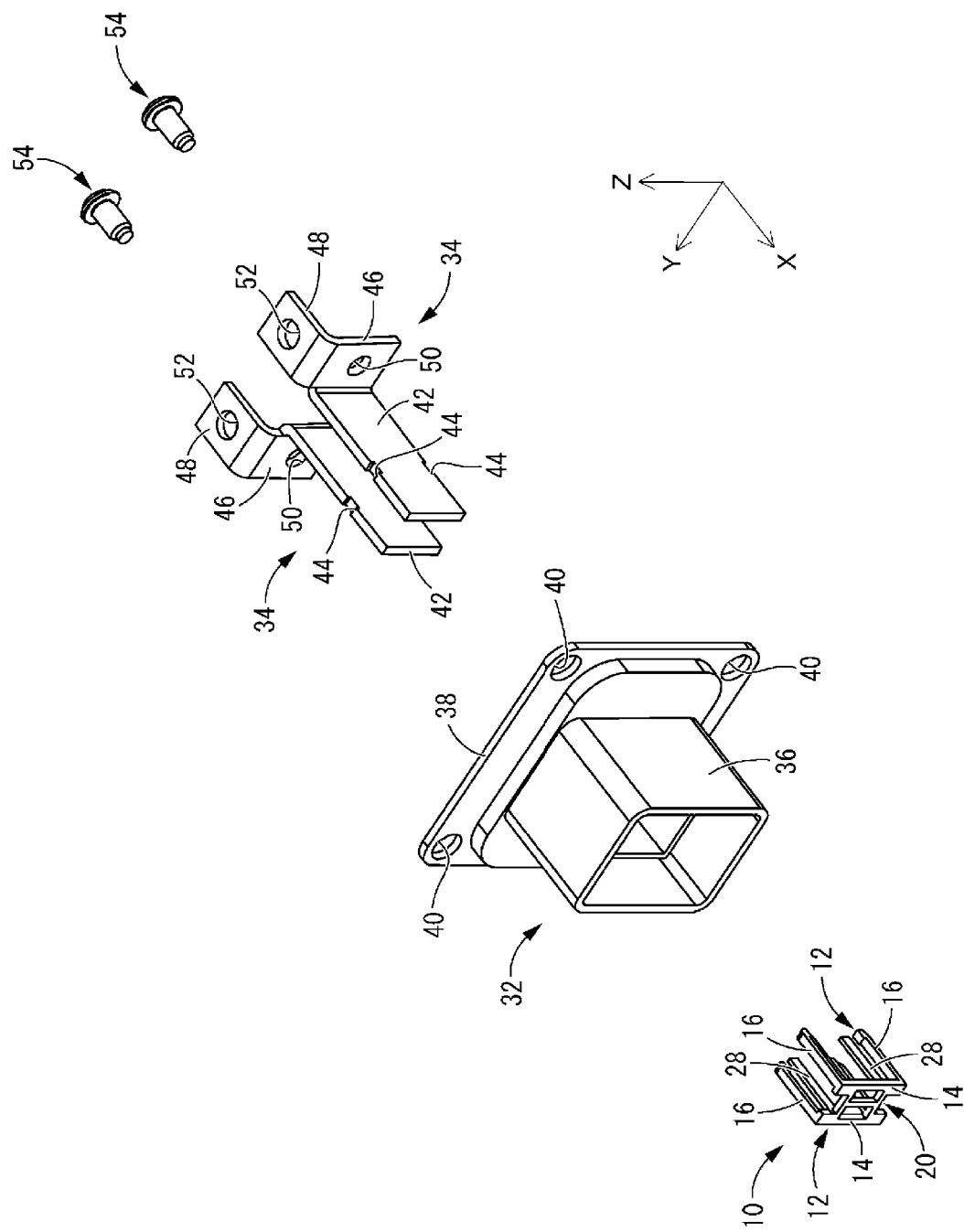
FIG. 6 is an exploded perspective view of the connector with electric shock prevention cap shown in FIG. 5.
Figure 7:
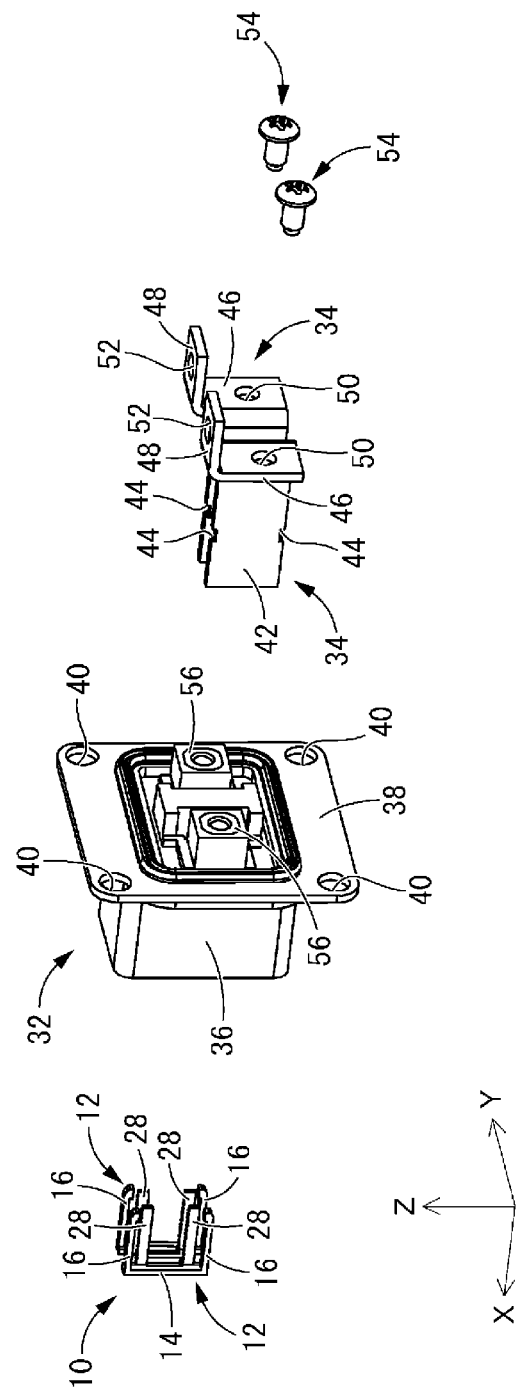
FIG. 7 is an exploded perspective view showing the connector with electric shock prevention cap shown in FIG. 6 when viewed from another direction.

The connector housing 32 is, for example, composed of an outer member made of electrically insulating synthetic resin or the like and an inner member made of metal and inserted in the outer member. As shown in FIGS. 5 to 7, the connector housing 32 is in the form of a bottomed rectangular tube as a whole and includes a tubular portion 36 in the form of a rectangular tube and a flange-like mounting piece 38 projecting radially outward on a rear end part. Bolt holes 40 are formed to penetrate through four corners of the mounting piece 38 in the front-rear direction. Note that a pair of terminal insertion holes (not shown) penetrating in the front-rear direction are provided on an inner peripheral side of the tubular portion 36 in the connector housing 32.

<Terminal Fittings 34>

The terminal fitting 34 is formed of an electrically conductive metal material. As shown in FIGS. 6 and 7, the terminal fitting 34 includes the terminal body portion 42 in the form of a flat plate. The terminal body portion 42 includes recessed grooves 44. The recessed grooves 44 are provided open in the upper and lower surfaces of the frame-like portion 42 at intermediate positions in the front-rear direction of the terminal body portion 42, and penetrate through the terminal body portion 42 in the lateral direction. The inner surface of a front side wall in the recessed groove 44 has an overhanging structure to be inclined forward with distance from an opening on a vertical side. The inner surface of the front side wall in the recessed groove 44 may have, for example, a stepped shape to be narrower in a part near the opening than in a part distant from the opening.

A fixing portion 46 and a wire connecting portion 48 are provided behind the terminal body portion 42. The fixing portion 46 is provided to be continuous with the rear end of the terminal body portion 42, extends orthogonally to the terminal body portion 42 and includes a bolt hole 50 penetrating in the front-rear direction. The wire connecting portion 48 is provided to be continuous with the rear end of the fixing portion 46, extends orthogonally to both the terminal body portion 42 and the fixing portion 46 and includes a bolt hole 52 penetrating in the vertical direction.

Note that, since the pair of terminal fittings 34, 34 are shaped plane-symmetrically in the lateral direction, one terminal fitting 34 is described, but the other terminal fitting 34 is not described. Note that the plane-symmetrical shapes of the pair of terminal fittings 34, 34 are not strictly limited to mathematically symmetrical shapes, but can be regarded as plane-symmetrical shapes as a whole even if these shapes are slightly different. Specifically, the terminal fittings 34, 34 can be regarded as having the plane-symmetrical shapes as a whole even if the presence or absence, the arrangement, the number, the shapes and the like of the recessed grooves 44 differ in the terminal fittings 34, 34.

<Mounting of Terminal Fittings 34 into Connector Housing 32>

The terminal fitting 34 is fixed to the connector housing 32. That is, the terminal fitting 34 is fixed to the connector housing 32 at the fixing portion 46 by threadably inserting a bolt 54 inserted through the bolt hole 50 of the fixing portion 46 into a nut portion 56 provided open in the rear surface of the connector housing 32. By fixing a rear part of the terminal fitting 34 to the connector housing 32 in this way, the terminal body portion 42 is positioned with respect to the connector housing 32 and displacements such as a swing of the terminal body portion 42 are suppressed. Therefore, a surrounding space taking into consideration the swing and the like of the terminal body portion 42 can be drastically made narrower than in a conventional female terminal supported by a braided body or the like, and the connector with electric shock prevention cap 30 can be reduced in size. Note that a method for fixing the fixing portion 46 to the connector housing 32 is not particularly limited.

The terminal body portion 42 of the terminal fitting 34 is inserted into the unillustrated terminal insertion hole provided in the connector housing 32 and, as shown in FIG. 5, projects forward in the inner periphery of the tubular portion 36 of the connector housing 32. The pair of terminal fittings 34, 34 are mounted side by side in the lateral direction in the connector housing 32. With the terminal fittings 34, 34 mounted in the connector housing 32, the terminal body portions 42, 42 are disposed side by side substantially in parallel in the lateral direction.

Note that the connector housing 32 is fixed to an unillustrated shield case or the like, for example, by unillustrated bolts inserted through the bolt holes 40. Further, the wire connecting portions 48 of the terminal fittings 34 are, for example, mounted on unillustrated wires via crimping terminals.

<Mounting of Electric Shock Prevention Cap 10 on Terminal Body Portions 42>

Figure 8:
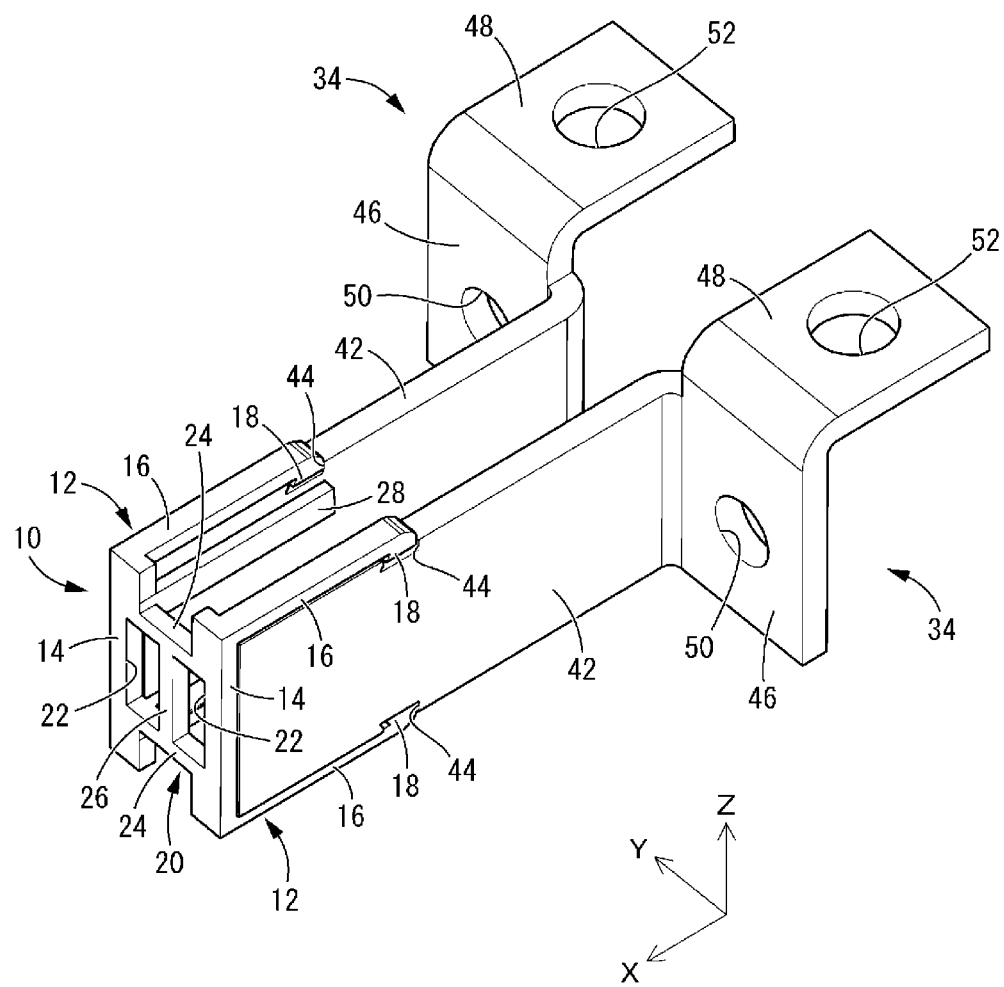
FIG. 8 is a perspective view showing the electric shock prevention cap shown in FIG. 1 in a state mounted on terminal fittings.

The electric shock prevention cap 10 is mounted on the terminal body portions 42 of the terminal fittings 34 fixed to the connector housing 32. That is, the electric shock prevention cap 10 is brought closer to the terminal body portions 42 from front and, as shown in FIG. 8, the peripheral edge covering portions 12 of the electric shock prevention cap 10 are mounted to overlap peripheral edge parts including the tip surfaces and both side surfaces in the vertical direction of the terminal body portion 42. Note that only the electric shock prevention cap 10 and the pair of terminal fittings 34, 34 are shown for visibility in FIG. 8.

The tip covering portions 14 of the electric shock prevention cap 10 are overlapped on the tip surfaces of the terminal body portions 42 while being held in contact with or slightly separated from these tip surfaces, and the side edge covering portions 16, 16 thereof are overlapped on the side surfaces in the vertical direction of the terminal body portions 42 while being held in contact with or slightly separated from these side surfaces. Further, the detachment prevention ribs 28 are inserted between the pair of terminal body portions 42, 42 facing each other, and are overlapped on facing inner surfaces, which are surfaces in the plate thickness direction, of the terminal body portions 42, 42, while being held in contact with or slightly separated from these facing inner surfaces. In this way, the electric shock prevention cap 10 is overlapped on the tip surfaces, the both side surfaces in the vertical direction and the inner surfaces in the lateral direction of the terminal body portions 42, and held on tip parts of the terminal body portions 42.

The electric shock prevention cap 10 is restricted from being displaced rearward with respect to the terminal body portions 42 by the contact of the peripheral edge covering portions 12 (tip covering portions 14) with the tip surfaces of the terminal body portions 42. The electric shock prevention cap 10 is restricted from being displaced in the vertical direction with respect to the terminal body portions 42 by the contact of the peripheral edge covering portions 12 (side edge covering portions 16) with the side surfaces in the vertical direction of the terminal body portions 42. The electric shock prevention cap 10 is restricted from being displaced outward in the lateral direction with respect to the terminal body portions 42 by the contact of the detachment prevention ribs 28 with the inner side surfaces in the lateral direction of the terminal body portions 42. By these contacts, the electric shock prevention cap 10 is positioned in a mounting direction on the terminal body portions 42 and prevented from coming off from the terminal body portions 42 in the vertical direction and lateral direction.

The locking projections 18 provided on the rear end parts of the side edge covering portions 16 are inserted into the recessed grooves 44 open in the peripheral edge parts of the terminal body portions 42. If the electric shock prevention cap 10 is going to move forward with respect to the terminal body portions 42, the locking projections 18 are locked to the front inner side surfaces of the recessed grooves 44 and the electric shock prevention cap 10 is restricted from being displaced forward with respect to the terminal body portions 42. In this way, the electric shock prevention cap 10 is prevented from coming off forward and being accidentally detached from the terminal body portions 42 after being mounted on the terminal body portions 42 from front.

Further, the tip covering portion 14, the side edge covering portions 16 and the detachment prevention ribs 28 of the electric shock prevention cap 10 on a left side are mounted on the left terminal body portion 42, and the tip covering portion 14, the side edge covering portions 16 and the detachment prevention ribs 28 of the electric shock prevention cap 10 on a right side are mounted on the right terminal body portion 42. Here, in the electric shock prevention cap 10, the tip covering portion 14, the side edge covering portions 16 and the detachment prevention ribs 28 on the left side and the tip covering portion 14, the side edge covering portions 16 and the detachment prevention ribs 28 on the right side are integrally coupled by the inner intrusion preventing portion 20. In this way, the electric shock prevention cap 10 can be collectively and simultaneously mounted on the pair of terminal body portions 42, 42. The number of steps in a mounting operation is reduced as compared to a conventional mode in which electric shock prevention caps are separately mounted on the pair of terminal body portions 42, 42. Moreover, an overlapping area of one electric shock prevention cap 10 with the terminal body portions 42, 42 increases, mounting is facilitated and accidental detachment is unlikely to occur.

Further, the left detachment prevention ribs 28 contact the left terminal body portion 42 and the right detachment prevention ribs 28 contact the right terminal body portion 42, whereby the electric shock prevention cap 10 is restricted from being displaced to both lateral sides with respect to the terminal body portions 42.

Further, the locking projections 18 are respectively provided on the four side edge covering portions 16 positioned with respect to each other, and inserted into the recessed grooves 44. Therefore, the electric shock prevention cap 10 is more strongly prevented from coming off forward from the terminal body portions 42 by four sets of the locking projections 18 and the recessed grooves 44. Moreover, by providing the locking projections 18 on all the four detachment prevention ribs 28, a drag against coming-off exerted by the locking of the locking projections 18 and the front inner surfaces of the recessed grooves 44 acts on the electric shock prevention cap 10 in a well-balanced manner. This results in the avoidance of troubles such as concentrated action of a load on the specific side edge covering portion 16 and detachment prevention rib 28 due to the action of an unbalanced force on the electric shock prevention cap 10.

The inner intrusion preventing portion 20 of the electric shock prevention cap 10 is disposed in front of a space between the pair of terminal body portions 42, 42 facing each other. In this way, a finger or tool is prevented from being inserted from front into between the pair of terminal body portions 42, 42 facing each other. As a result, an electric shock due to the contact of a finger or tool with the inner side surface in the lateral direction of the terminal body portion 42 is also prevented by the inner intrusion preventing portion 20 of the electric shock prevention cap 10.

Since the outer surfaces in the lateral direction of the terminal body portions 42, 42 having the electric shock prevention cap 10 mounted thereon serve as contact parts with unillustrated mating terminals, these outer surfaces are exposed without being protected by the electric shock prevention cap 10. Accordingly, as shown in FIG. 5, the tubular portion 36 of the connector housing 32 is disposed outwardly of the terminal body portions 42, 42 in the lateral direction. A distance between the tip covering portion 14 of the electric shock prevention cap 10 and the tubular portion 36 is reduced to such an extent that the intrusion of a finger or tool can be prevented. In this way, the contact of the finger or tool with the lateral outer surface of the terminal body portion 42 is prevented by the cooperation of the tip covering portion 14 and the tubular portion 36.

Note that, the unillustrated mating terminals are inserted on laterally outer sides of the electric shock prevention cap 10, for example, in a connected state of the connector with electric shock prevention cap 30 and the unillustrated mating connector. Further, if the mating connector is provided with electric shock prevention ribs for preventing an electric shock due to finger contact with the mating terminals in the mating connector, the electric shock prevention ribs are inserted into the insertion holes 22, 22, whereby the electric shock prevention ribs can be prevented from being caught on the electric shock prevention cap 10.

Second Embodiment

Figure 9:
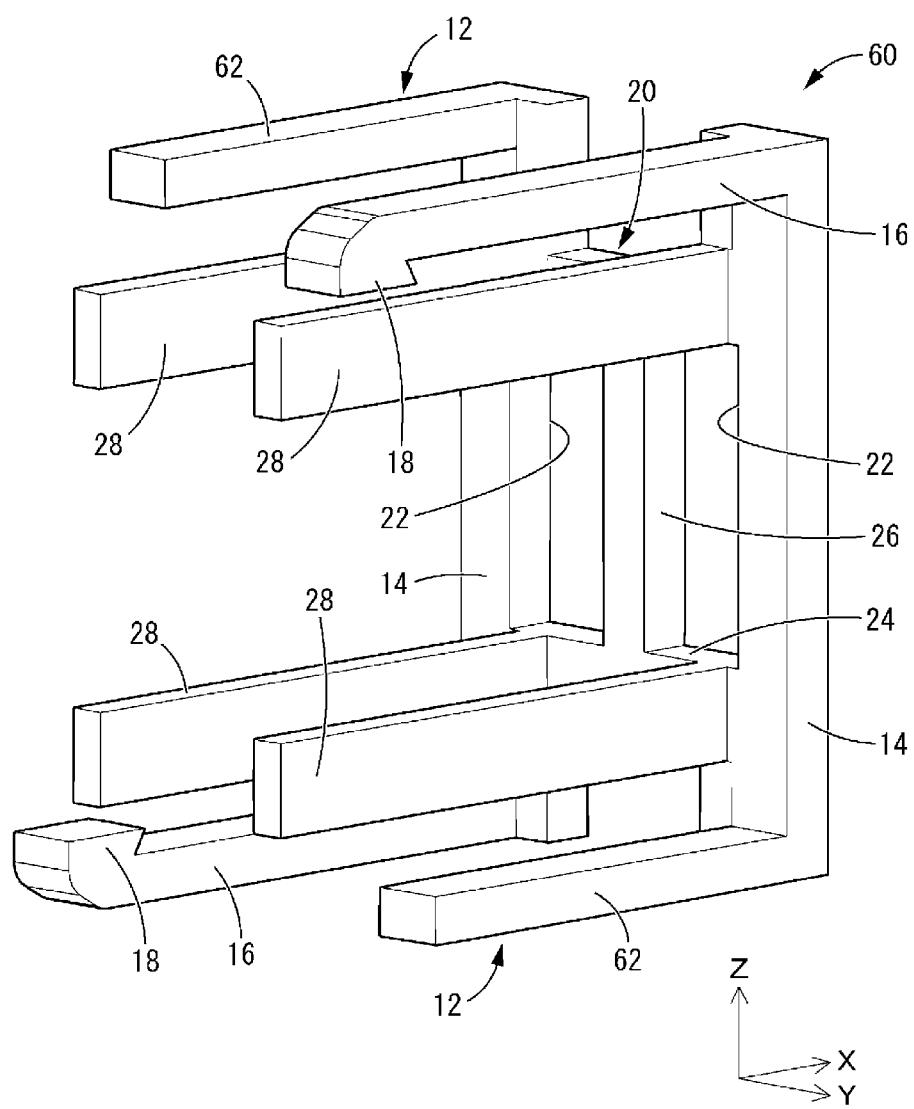
FIG. 9 is a perspective view of an electric shock prevention cap according to a second embodiment.

FIG. 9 shows a second embodiment as another specific example. In the following description, substantially the same members and parts as those of the first embodiment are denoted by the same reference signs in figures and are not described.

In an electric shock prevention cap 60 of the second embodiment, a locking projection 18 is provided on each of a left-upper side edge covering portion 16 and a right-lower side edge covering portion 16. In contrast, a left-lower side edge covering portion 62 and a right-upper side edge covering portion 62 are not provided with the locking projection 18 and are in the form of rectangular plates or bars extending in the front-rear direction while having a substantially constant cross-sectional shape as a whole.

As just described, the locking projections 18 may not necessarily be provided on all the side edge covering portions as in the first embodiment. Further, by providing the locking projections 18 only on the left-upper side edge covering portion 16 and the right-lower side edge covering portion 16 disposed diagonally, a force acts on the electric shock prevention cap 60 in a well-balanced manner when the locking projections 18 are locked into recessed grooves of unillustrated terminal body portions to exert a drag against coming-off of the electric shock prevention cap 60. Note that a pair of the terminal body portions to which the electric shock prevention cap 60 is mounted are provided with the recessed groove in the upper surface of the left terminal body portion and the recessed groove in the lower surface of the right terminal body portion.

Figure 10:
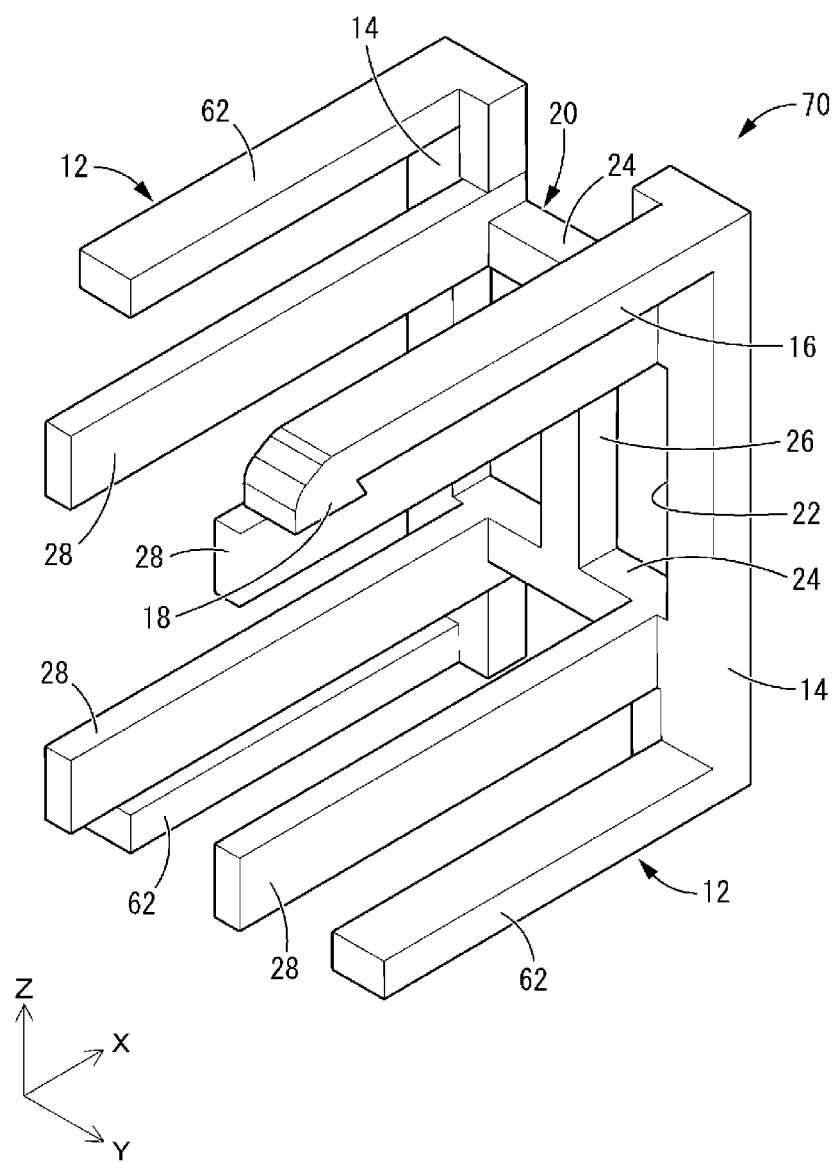
FIG. 10 is a perspective view of an electric shock prevention cap according to another embodiment.

Further, the locking projection 18 may be provided only on one side edge covering portion 62 as in an electric shock prevention cap 70 as another specific example shown in FIG. 10. However, the locking projections 18 are desirably provided on three or more side edge covering portions 62 to obtain a sufficient drag against coming-off. Further, the locking projection 18 may be provided on each of two side edge covering portions 62 to be mounted on one terminal body portion and no locking projection may be provided on two side edge covering portions 62 to be mounted on the other terminal body portion. However, in terms of a balance of a force acting on the electric shock prevention cap, difficulty to come off and the like, a locking projection is preferably provided on each of side edge covering portions to be mounted on each terminal body portion.

Third Embodiment

Figure 11:
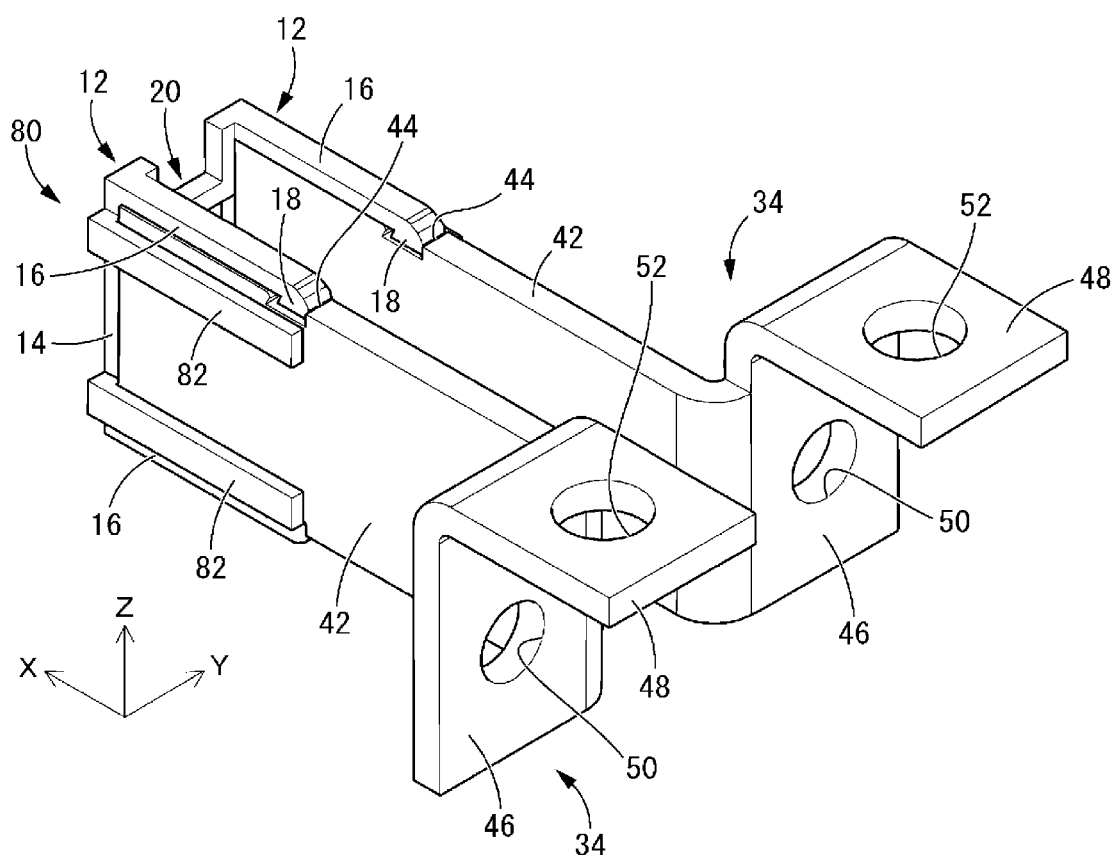
FIG. 11 is a perspective view showing an electric shock prevention cap according to a third embodiment in a state mounted on terminal fittings.

FIG. 11 shows a third embodiment as another specific example. In an electric shock prevention cap 80 of the third embodiment, detachment prevention ribs 82 are located outwardly of side edge covering portions 16 in the lateral direction. With the electric shock prevention cap 80 shown in FIG. 11 mounted on terminal body portions 42, 42, the detachment prevention ribs 82 are overlapped on outer surfaces in the lateral direction of the respective terminal body portions 42.

As just described, even if the detachment prevention ribs 82 are overlapped on the outer surfaces in the lateral direction of the terminal body portions 42, the electric shock prevention cap 80 is positioned in the lateral direction by the contact of the detachment prevention ribs 82 with the terminal body portions 42.

Note that detachment prevention ribs need not necessarily be provided to overlap the both terminal body portions 42 and, for example, can be provided to overlap only one terminal body portion 42. That is, detachment prevention ribs 28 on an inner side and the detachment prevention ribs 82 on an outer side may be provided to overlap the respective inner and outer surfaces in the lateral direction of the one terminal body portion 42.

Fourth Embodiment

Figure 12:
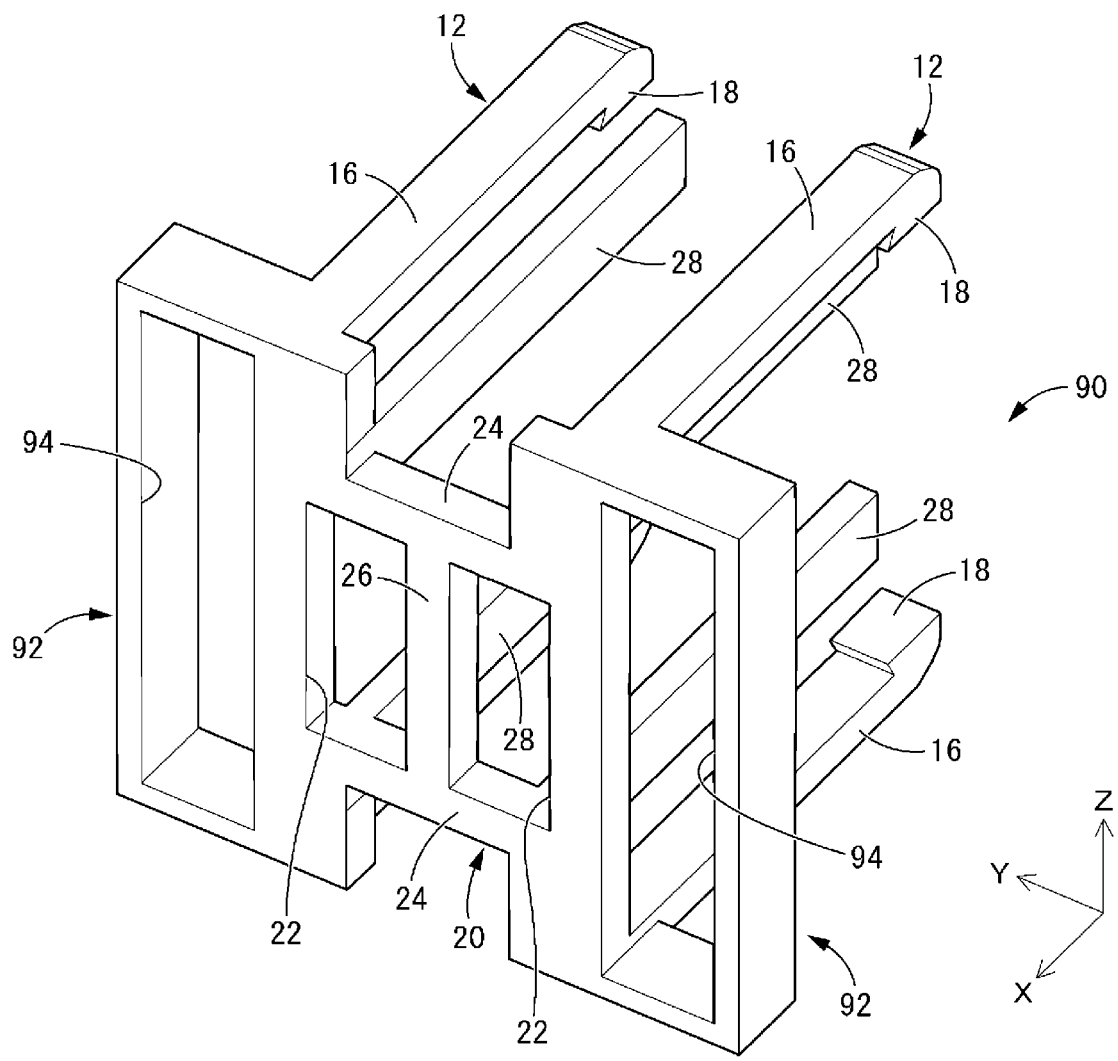
FIG. 12 is a perspective view of an electric shock prevention cap according to a fourth embodiment.

FIG. 12 shows a fourth embodiment as another specific example. An electric shock prevention cap 90 of the fourth embodiment includes outer intrusion preventing portions 92, 92. The outer intrusion preventing portion 92 is disposed on an outer side opposite to an inner intrusion preventing portion 20 in the lateral direction with respect to a tip covering portion 14, and integrally formed to the tip covering portion 14. The outer intrusion preventing portion 92 is in the form of a rectangular plate as a whole, and includes a mating terminal insertion hole 94 penetrating in the front-rear direction. By inserting an unillustrated mating terminal into the mating terminal insertion hole 94, an unillustrated terminal body portion and the mating terminal are overlapped and brought into conduction in the lateral direction. The mating terminal insertion hole 94 is formed to have such a cross-sectional shape and a cross-sectional size that a finger or assumed tool cannot pass through.

For example, if the terminal body portions 42 and the tubular portion 36 of the connector housing 32 are largely separated in the lateral direction in the first embodiment (FIG. 5), a finger or tool is insertable into between laterally facing surfaces of the terminal body portions 42 and the tubular portion 36. Here, if the electric shock prevention cap 90 including the outer intrusion preventing portions 92 of the fourth embodiment is adopted, the intrusion of the finger or tool into spaces laterally outward of the terminal body portions having the electric shock prevention cap 90 mounted thereon can be hindered by the outer intrusion preventing portions 92 of the electric shock prevention cap 90.

Other Embodiments

The technique described in this specification is not limited to the above described and illustrated embodiments. For example, the following embodiments are also included in the technical scope of the technique described in this specification.

(1) Although the inner intrusion preventing portion 20 is structured to include two insertion holes 22, 22 in the above embodiments, the shape of the inner intrusion preventing portion is not particularly limited. Specifically, the inner intrusion preventing portion may be, for example, in the form of a plate or bar extending in the lateral direction and may not be provided with the insertion holes 22.

(2) For example, the detachment prevention ribs may extend in the vertical direction to connect the upper and lower side edge covering portions 16, 16 or may be in the form of braces provided over the tip covering portion 14 and the side edge covering portions 16.

(3) Although the mating terminal is overlapped on the outer surface in the lateral direction of the terminal body portion 42 in the above embodiments, the mating terminal may be, for example, inserted through the insertion hole 22 of the inner intrusion preventing portion 20 and overlapped on the inner surface in the lateral direction of the terminal body portion 42. Note that if the mating terminal inserted through the insertion hole 22 is overlapped on the inner surface in the lateral direction of the terminal body portion 42 in the third embodiment, the detachment prevention ribs 82 can be provided to entirely cover the outer surface in the lateral direction of the terminal body portion 42. Further, if the mating terminal inserted through the insertion hole 22 is overlapped on the inner surface in the lateral direction of the terminal body portion 42 in the fourth embodiment, the outer intrusion preventing portion 92 may not be provided with the mating terminal insertion hole 94.

(4) If the mating terminals are inserted between the detachment prevention ribs 28, the detachment prevention ribs 28 can be also used as a guide for guiding the mating terminals to predetermined connection positions by sliding in contact with the mating terminals.

Figure 13:
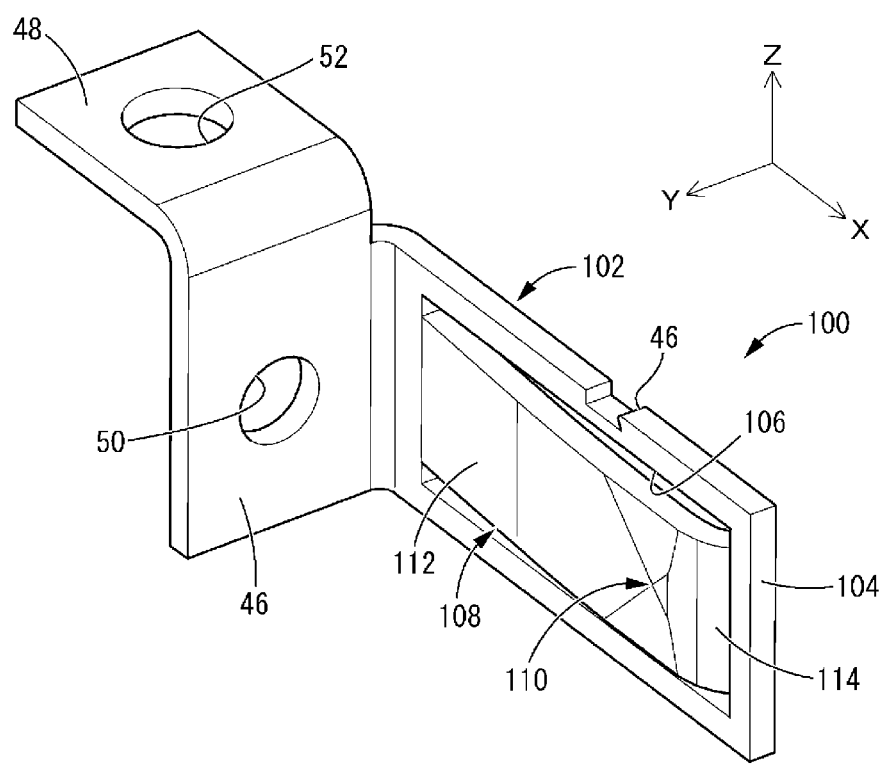
FIG. 13 is a perspective view of a terminal fitting according to another embodiment.

(5) If the terminal fitting includes the terminal body portion in the form of a flat plate, a specific structure thereof can be appropriately changed. For example, as in a terminal fitting 100 shown in FIG. 13, a terminal body portion 102 includes a frame-like portion 104 constituting an outer peripheral end part and a resilient contact portion 108 provided on an inner peripheral side of the frame-like portion 104 via a slit 106.

The resilient contact portion 108 is formed by partially cutting and raising a metal plate constituting the terminal body portion 102, and integrally connected to the frame-like portion 104 on a base end. The resilient contact portion 108 is in the form of a leaf spring resiliently deformable in a plate thickness direction by being cut and raised, and allowed to tilt in the plate thickness direction with respect to the frame-like portion 104 by resilient deformation. The slit 106 formed between the frame-like portion 104 and the resilient contact portion 108 extends while surrounding the resilient contact portion 108 on three sides including a front side and both upper and lower sides.

The resilient contact portion 108 is at least partially inclined outward in the lateral direction, which is the plate thickness direction, from a rear end as the base end connected to the frame-like portion 104 toward a front end as a tip formed as a free end by the slit 106. In this way, the resilient contact portion 108 projects outward in the lateral direction to an overlapping side with an unillustrated mating terminal with respect to the frame-like portion 104.

A top part 110 of the resilient contact portion 108 where a projecting amount in the plate thickness direction from the frame-like portion 104 is maximum is set at an intermediate position between the rear end and the front end. The resilient contact portion 108 includes a first inclined portion 112 inclined to the overlapping side with the unillustrated mating terminal in the plate thickness direction from the rear end toward the top part 110, and a projecting mount of the resilient contact portion 108 from the frame-like portion 104 in the plate thickness direction gradually increases from the rear end toward the top part 110. Further, the resilient contact portion 108 includes a second inclined portion 114 inclined to a side opposite to the overlapping side with the unillustrated mating terminal from the top part 110 toward the front end, and the projecting amount of the resilient contact portion 108 from the frame-like portion 104 in the plate thickness direction gradually decreases from the top part 110 toward the front end. The top part 110 of the resilient contact portion 108 is a convex spot and projects more with respect to the frame-like portion 104.

If the terminal fitting 100 structured as just described is adopted, a contact state of the terminal body portion 102 and the mating terminal is stably realized since the resilient contact portion 108 of the terminal body portion 102 is resiliently pressed against the unillustrated mating terminal. Further, a spring-like structure for pressing the terminal body portion 102 and the mating terminal against each other is realized by a simple structure of cutting and raising the terminal body portion 102 without required an addition component. Further, since a tip part of the resilient contact portion 108 includes the second inclined portion 114, the mating terminal is not caught on the resilient contact portion 108.

Further, since the terminal body portion 102 of the terminal fitting 100 is provided with the frame-like portion 104 around the resilient contact portion 108, the peripheral edge covering portions of the electric shock prevention caps of the first to fourth embodiments are mounted on the frame-like portion 104. The frame-like portion 104 as a part, on which the electric shock prevention cap is mounted, is neither deformed nor displaced and, even if the terminal body portion 102 is provided with a movable part like the resilient contact portion 108, the state of the electric shock prevention cap mounted on the terminal body portion 102 is stably held.

LIST OF REFERENCE NUMERALS

- 10 electric shock prevention cap
- 12 peripheral edge covering portion
- 14 tip covering portion
- 16 side edge covering portion
- 18 locking projection
- 20 inner intrusion preventing portion
- 22 insertion hole
- 24 coupling portion
- 26 dividing portion
- 28 detachment prevention rib
- 30 connector with electric shock prevention cap
- 32 connector housing
- 34 terminal fitting
- 36 tubular portion
- 38 mounting piece
- 40 bolt hole
- 42 terminal body portion
- 44 recessed groove
- 46 fixing portion
- 48 wire connecting portion
- 50 bolt hole
- 52 bolt hole
- 54 bolt
- 56 nut portion
- 60 electric shock prevention cap
- 62 side edge covering portion
- 70 electric shock prevention cap
- 80 electric shock prevention cap
- 82 detachment prevention rib
- 90 electric shock prevention cap
- 92 outer intrusion preventing portion
- 94 mating terminal insertion hole
- 100 terminal fitting
- 102 terminal body portion
- 104 frame-like portion
- 106 slit
- 108 resilient contact portion
- 110 top part
- 112 first inclined portion
- 114 second inclined portion

What is claimed is:

1. An electric shock prevention cap, comprising:
a pair of peripheral edge covering portions for covering peripheral edges of tip parts of a pair of terminal body portions by being mounted on the pair of terminal body portions in the form of flat plates and disposed side by side in a plate thickness direction; and
an inner intrusion preventing portion provided between the pair of peripheral edge covering portions to couple the pair of peripheral edge covering portions to each other,
wherein the inner intrusion preventing portion is in a form of a rectangular plate extending in a lateral direction as a whole, and
wherein at least one surface in the plate thickness direction of each terminal body portion is exposed with the electric shock prevention cap mounted on the pair of terminal body portions.

2. The electric shock prevention cap of claim 1, comprising a detachment prevention rib to be overlapped on a surface in the plate thickness direction of the terminal body portion.

3. The electric shock prevention cap of claim 1, wherein the peripheral edge covering portion is provided with a locking projection projecting toward the terminal body portion and to be locked to a peripheral edge part of the terminal body portion.

4. The electric shock prevention cap of claim 1, wherein the inner intrusion preventing portion is provided with an insertion hole penetrating therethrough.

5. The electric shock prevention cap of claim 1, comprising a pair of outer intrusion preventing portions on sides opposite to the inner intrusion preventing portion with respect to the pair of peripheral edge covering portions.

6. A connector with electric shock prevention cap, comprising:
a pair of terminal fittings including terminal body portions in the form of flat plates and disposed side by side in a plate thickness direction of the terminal body portions; and
an electric shock prevention cap to be mounted on a pair of the terminal body portions,
wherein the electric shock prevention cap includes:
a pair of peripheral edge covering portions for covering peripheral edges of tip parts of the pair of terminal body portions; and
an inner intrusion preventing portion provided between the pair of peripheral edge covering portions to couple the pair of peripheral edge covering portions to each other,
wherein the inner intrusion preventing portion is in a form of a rectangular plate extending in a lateral direction as a whole, and
wherein at least one surface in the plate thickness direction of each terminal body portion is exposed with the electric shock prevention cap mounted on the pair of terminal body portions.

7. The electric shock prevention cap of claim 1, wherein the pair of peripheral edge covering portions are U-shaped as a whole.

8. The electric shock prevention cap of claim 7, wherein the pair of peripheral edge covering portions integrally include a tip covering portion to be overlapped on a tip surface of the terminal body portion.

9. The electric shock prevention cap of claim 1, wherein the rectangular plate comprises at least two openings.

10. The electric shock prevention cap of claim 1, wherein the rectangular plate comprises a rectangular opening.

11. The electric shock prevention cap of claim 7, wherein the rectangular plate comprises at least two openings.

12. The electric shock prevention cap of claim 7, wherein the rectangular plate comprises a rectangular opening.

* * * * *